United States Patent [19]
VandenBerg et al.

[11] 3,917,055
[45] Nov. 4, 1975

[54] CAPSULE RECTIFICATION APPARATUS

[75] Inventors: Willard J. VandenBerg; Robert E. Ramsey, both of Indianapolis; Robert L. Bollman, Mooresville; Richard E. Krackenberger, Beech Grove; George Pieczko, Indianapolis, all of Ind.

[73] Assignee: Eli Lilly & Company, Indianapolis, Ind.

[22] Filed: Jan. 7, 1974

[21] Appl. No.: 431,116

[52] U.S. Cl. ................ 198/278; 198/288; 221/168
[51] Int. Cl.² .................................... B65G 47/24
[58] Field of Search ......... 198/244, 268, 288, 278, 198/131, 253; 221/168, 172, 173

[56] References Cited
UNITED STATES PATENTS
3,811,552  5/1974  Wagers et al. ................ 221/168
FOREIGN PATENTS OR APPLICATIONS
569,759  11/1957  Italy ............................ 198/131

Primary Examiner—Evon C. Blunk
Assistant Examiner—Douglas D. Watts
Attorney, Agent, or Firm—Trask, Jenkins & Hanley

[57] ABSTRACT

Randomly oriented medicinal capsules are processed to a uniform cap-forward orientation at high handling rates. The capsules are conveyed endwise in a series of deep conveyor cavities, each with an upper portion to loosely contain the capsule, with shoulders at the bottom of such portion defining a rectification slot of a width to pass a capsule body but retain its cap, and deep enough below the shoulders to substantially contain the body of an upstanding capsule supported at its cap edge by the shoulders. The conveyor slopes upward and is centrally slotted to straddle a thin cam rail which supports capsules lengthwise in the upper portions of the cavities.

In a rectification zone, the cam rail rises to lift the capsules well away from the side shoulders, and then terminates abruptly above a suction passage which draws air downward through the conveyor cavities. As a body-forward capsule crosses the rail terminus, its rear end is supported by the rail and its forward end is unsupported in the downward air stream. This tips it forward about the rail terminus and its body passes through the slot. Its cap edge is carried into engagement with the side shoulders with sufficient momentum and at an angular orientation which causes the cap edges to wedge slightly between the side shoulders to form two side points of engagement about which further tilting tends to occur and which resists sliding of the capsule lengthwise of the cavity shoulders. The tilting carries the capsule to a forward-leaning position, and the capsule then engages an underlying secondary cam rail which rises to lift the lower end of the capsule. Such lifting, combined with continuing downward air flow, moves the capsule to a cap-forward position in the cavity. Any capsule which may slip rearward in its cavity is contained by the deep walls, and is lifted by the secondary cam without danger of being pinched or caught. Capsules originally in cap-forward position are not changed, since their forward caps will be supported by the cavity shoulders as the capsules cross the rectification zone.

18 Claims, 12 Drawing Figures

Fig. 12

CAPSULE RECTIFICATION APPARATUS

BACKGROUND OF THE INVENTION

This application relates to an improvement of capsule rectification apparatus such as that shown in the prior application of William D. Wagers, Jr., et al., Ser. No. 328,403, now U.S. Pat. No. 3,838,766 which is a division of prior application Ser. No. 105,262, filed Jan. 11, 1971, now U.S. Pat. No. 3,756,402, for Capsule Inspection Apparatus Method.

Medicinal capsules, which are made and used in large numbers, consist of caps and bodies which are telescopically assembled, empty, with sufficient tightness to stay together during handling as empty capsules but sufficiently loose to permit disassembly for filling. In their inspection, and in their handling for filling and other processing operations, it is necessary to present such capsules to the inspection or processing apparatus in uniform endwise orientation, conveniently in cap-forward orientation, and to do so at high rates, desirably sufficient to take the full output of a capsule making machine, such as a rate of 600 to 1200 or more capsules per minute.

In the apparatus of such prior applications, the capsule conveyor consists of a series of buckets forming individual elongated cavities which are relatively shallow. Each cavity has an upper portion of a size to loosely receive a capsule in lengthwise position, with a pair of opposed ribs at the bottom defining an open rectification slot to pass a capsule body but retain its cap. Capsules are supported in the cavities by an underlying flat supporting rail of unvarying height on which the buckets slide. At a rectification zone, the underlying rail is formed with an abrupt shoulder and an open slot through which downward air flow is induced. As the capsules move across the rail shoulder, body-forward capsules are tilted thereabout to an upright position with their lower body ends projecting below the conveyor buckets. The upstanding capsule is further tilted to a forward-leaning position by an overlying brush, and is lifted back into the conveyor cavity by an underlying, rapidly-moving and sloping belt. An overlying plate prevents the belt from throwing capsules out of the conveyor. The present invention eliminates the overlying brush and the underlying belt and the overlying plate, yet provides improved orientation at high rates with less chance of damaging the capsules.

SUMMARY OF THE INVENTION

In accordance with the present invention, capsules are loaded in random orientation in a series of individually elongated, deep cavities in a conveyor. The conveyor is preferably a series of individual buckets connected in chain relation. Each cavity has an upper portion similar to the upper portion of the cavities of the previous applications, and of a depth approximately equal to the diameter of a capsule, and of a length and width to loosely receive a capsule therein. This upper portion has a pair of side shoulders near its bottom defining a rectification slot of a width to pass the body of a capsule but to retain the cap of a capsule. Below such shoulders, each cavity has a deep lower portion of a width and depth below the shoulders sufficient to substantially contain the full length of the depending body of a capsule standing in upright position and supported at the edges of its cap by the shoulders of the cavity.

The conveyor is formed with a central longitudinal rail slot which straddles a narrow cam rail. The cam rail may be carried by a slide rail along which the buckets slide in their conveyor movement. The cam rail is narrower than the cavities, and permits communication along its sides between suction openings in the slide rail with the cavities so as to induce downward air flow through the cavities for purposes of loading and retaining capsules therein. The upper edge of the cam rail normally supports capsules in the upper portions of the cavities.

At a rectification position, the cam rail slopes upward to lift the capsules to positions in which their side faces lie well above the shoulders in the cavities. The cam rail then terminates abruptly at a terminus immediately above a suction passage so that suction will draw air downward through the cavities. As a body-forward capsule is carried across the terminus its rear end will be supported by the cam rail while its forward end will project unsupported into the down flow of air through the cavity. This causes the capsule to tilt sharply about the terminus, and its body can pass between the shoulders. Since the capsule tilts from a substantially raised position, a considerable amount of tilting can occur before the side edges of the capsule cap engage the side shoulders of the cavity. This appears to cause the open end of the capsule to engage the shoulders in such a way that the cap end is slightly wedged between the shoulders to form side points of engagement between the cap and the shoulders. The capsule is then pivotally supported by the shoulders at such points, so that further tilting of the capsule tends to occur about such points, and the capsule is held against sliding rearward in the cavity along the shoulders. The conveyor desirably slopes upward, as at 45°. The wedging action, in combination with the downward-induced air flow through the cavity, causes each capsule to tilt to an upstanding position in space and to a forward-leaning position relative to the sloping conveyor, and retains the capsule at an intermediate position lengthwise of the cavity. The capsule is then carried by the conveyor against and over an upwardly inclined secondary cam rail. This has a rearward cam nose which may engage the lower end of the capsule body to tilt the pivoted capsule further forward, and the cam rail has a camming surface which then lifts the lower end of the tilted capsule and turns the tilted capsule to a cap-forward position in the upper portion of the cavity. In such turning, the lower end of the capsule may engage the rear face of the lower portion of the cavity, in which case it will be cammed forward by such rear face as it is cammed upward by the cam rail. Any capsule which slides rearward against the rear face of the cavity will be lifted along that face by the cam rail and tilted forward thereby and by the continuing downward air flow, without danger of being pinched between the parts.

This rectification action is found to be highly effective and reliable without the necessity for the overlying brush and underlying camming belt employed in the apparatus in the aforesaid prior applications.

With the modified conveyor buckets, the conveyor loading mechanism and the conveyor transfer mechanism shown in the prior applications are also modified.

BRIEF DESCRIPTION OF THE DRAWINGS

The accompanying drawings illustrate the invention and, by way of example, show a preferred embodiment of the invention. In such drawings.

DESCRIPTION OF THE PREFERRED EMBODIMENT

Figure 2:
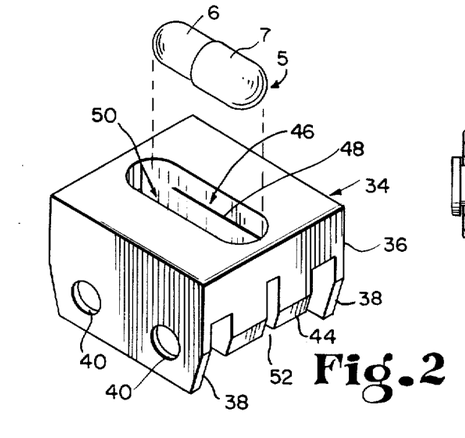
FIG. 2 is a perspective view of a preferred form of conveyor bucket for the machine of FIG. 1.

The apparatus shown in the drawings is for securing uniform cap-forward orientation of medicinal capsules 5 of the type shown in FIG. 2, composed of a body part 6 and a cap part 7 telescopically received over the body part 6.

Figure 1:
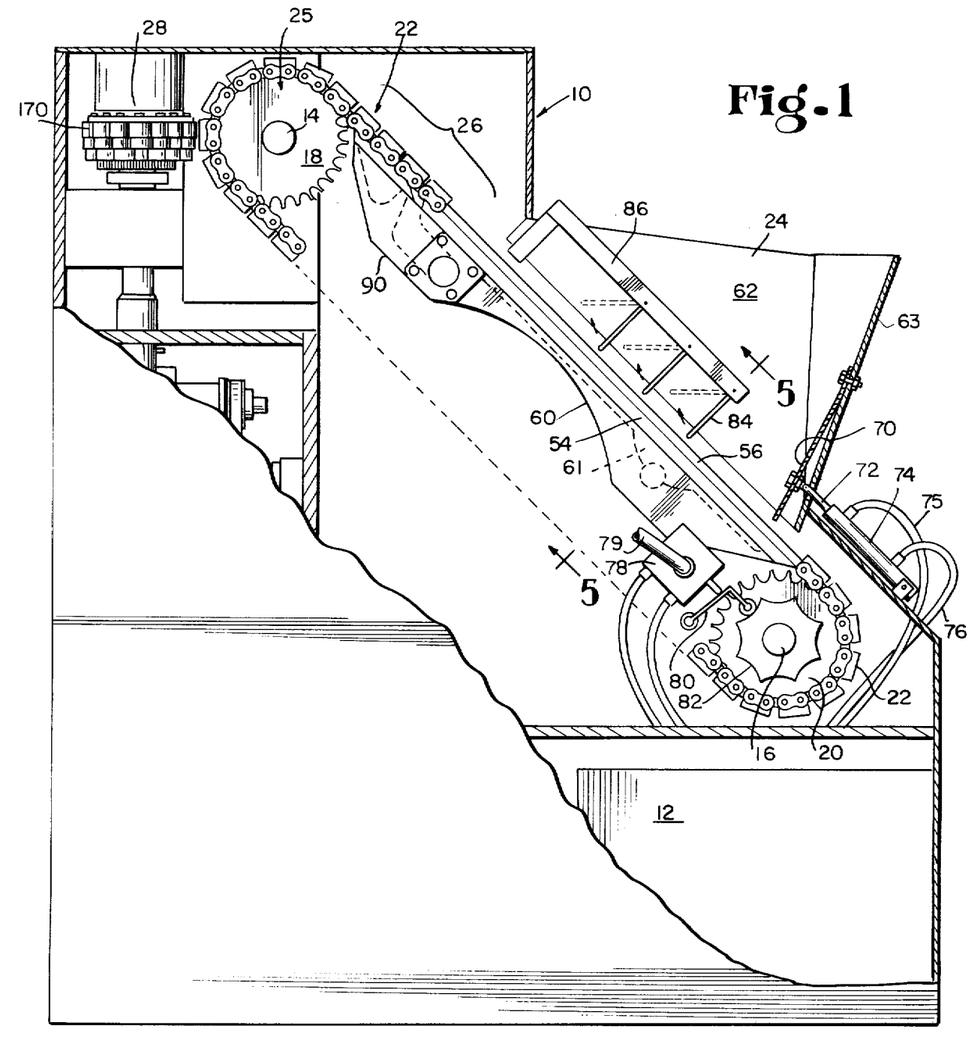
FIG. 1 is a vertical section through a cpasule inspection machine embodying rectification mechanism in accordance with the invention.

The apparatus comprises a housing 10 having drive components in its lower compartment 12 and supporting a pair of upper and lower shafts 14 and 16 on which are mounted upper and lower pairs of sprockets 18 and 20, about which the side chains of a conveyor 22 are trained. The upper operative stretch of the conveyor runs from the lower sprockets 20 upward at an inclination of 45° through a loading zone below a hopper 24, thence to a rectifying zone 26, and thence to the upper sprockets 18. As described below, such upper sprockets are part of a transfer wheel 25 for transferring capsules from the conveyor to an inspection or other processing head 28 mounted opposite the discharge point of the transfer wheel. Such inspection and processing head 28 is more fully described in the above-identified co-pending application of William D. Wagers, Jr., et al. and in U.S. Pat. No. 3,756,402.

Conveyor

Figure 3:
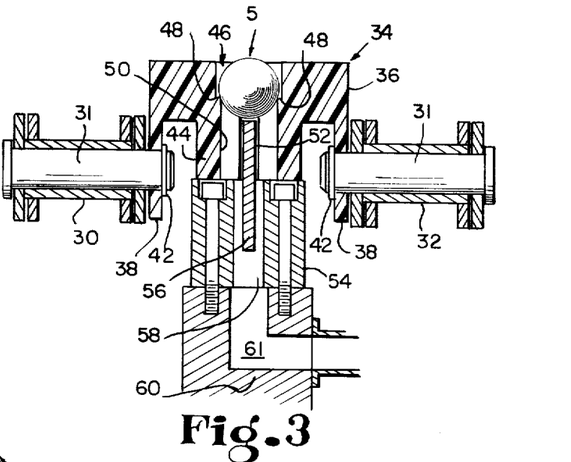
FIG. 3 is a transverse section showing the bucket and its relation to its conveyor side chains and to its supporting slide rail and cam rail.

As shown in FIGS. 2 and 3, the chain conveyor comprises a pair of spaced parallel chains 30 and 32, each composed of a series of pin links and roller links. These support between them a series of conveyor buckets 34. Each bucket has an upper body portion 36, with depending outer skirts 38 formed with chain pin holes 40 which are received over the inner ends of pins 31 of the chain, and held in place by snap rings 42. Each bucket 34 also has a central depending portion 44 with a flat bottom surface adapted to ride on a supporting rail. The upper operative stretch of the conveyor consists of a continuous series of substantially contiguous buckets 34.

Each bucket contains a central longitudinal cavity 46 with parallel side walls and rounded ends, having an upper portion of a size to loosely receive a single medicinal capsule 5 endwise in the direction of travel. Downward from the upper surface of the bucket, the side walls of the cavity 46 are formed with shoulders 48 spaced to define a downwardly open rectification slot 50. The width between the shoulders is such that the body 6 of the capsule will pass between the shoulders and through the slot as shown in dotted lines in FIG. 4, whereas the cap 7 will be retained by the shoulders and will not pass through the slot 50.

The buckets are distinguished from the buckets shown in U.S. Pat. No. 3,756,402 in that the body 36 includes a central lower portion 44 which extends downward from the shoulders 48 a distance substantially equal to the projecting length of a capsule body 6 when the capsule is supported at the edges of its cap 7 by the shoulders 48 as shown in dotted lines in FIG. 4. This provides that the lower body end of the capsule will at all times be substantially contained within the capsule cavity and will not be exposed for damage from below.

Figure 6:
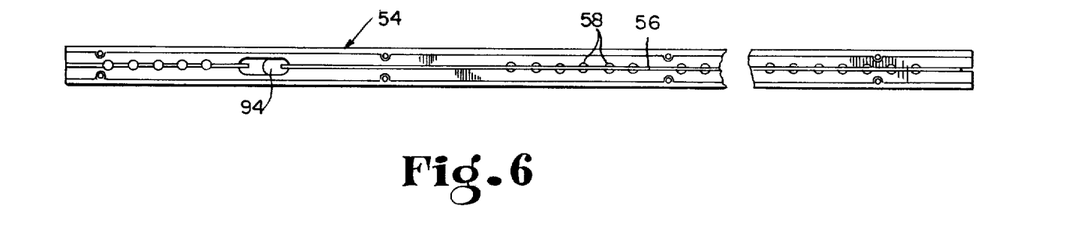
FIG. 6 is a plan view of the slide rail and cam rail.

The series of buckets 34 is supported in its travel throughout its upper operative stretch by an underlying bucket-supporting slide rail 54, shown in plan in FIG. 6 and in section in FIG. 3. This has an upper flat top surface for slidably supporting the buckets at the bottom faces of the lower portions 44. Each bucket is formed with a central slot 52 to receive and straddle a central cam rail 56 carried by the slide rail 54 and upstanding therefrom. Over the length of the loading zone, the slide rail 54 is provided with a series of central drilled holes 58 through which the cam rail 56 runs but which provide openings at its sides for communication between the cavities 46 of the buckets 34 and the suction chamber 61 of an underlying suction manifold 60 on which the rail 54 is mounted. Suction chamber 61 runs the full length of conveyor travel below the hopper 24.

Loading

Figure 5:
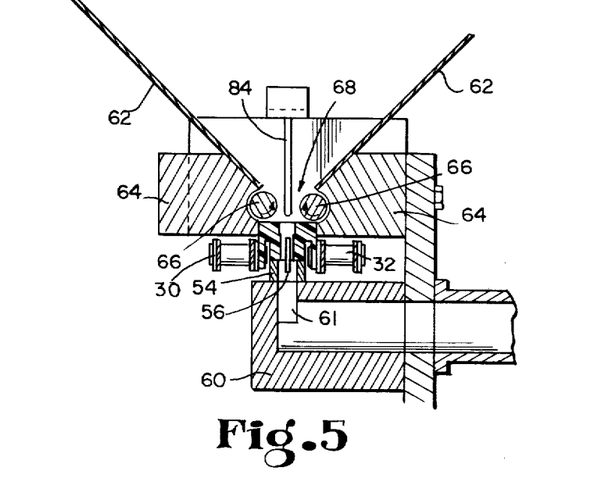
FIG. 5 is a transverse section taken substantially on the line 5—5 of FIG. 1 and showing loading apparatus.

The conveyor loading mechanism is shown in FIGS. 1 and 5. The side walls 62 of the hopper are mounted on supporting blocks 64 carried by the frame of the machine. The inner bottom edges of the blocks are grooved to form a channel for travel of the conveyor buckets 34. The buckets ride on the face of the slide rail 54 which lies between the chains 30 and 32. Immediately above the conveyor buckets, the blocks 64 are shaped to form part-cylindrical grooves for the reception of a pair of rolls 66. Such rolls lie in substantially tangent relation with the inner face of the hopper walls 62 and are spaced apart to define between them a feed slot 68 leading to the cavities 46 in the conveyor buckets 34. The rolls 66 are mounted in bearings at their opposite ends and are driven to rotate oppositely in directions such that their faces defining the feed slot move upward and outward to urge misaligned capsules away from such slot. The surfaces of the rolls are desirably frictional surfaces such as of rubber. Downward air flow through the feed slots 68 is induced by vacuum in the manifold 60 drawing air downward through the central holes 58 which communicate with the conveyor cavities on opposite sides of the central cam rail 56. The slide rail 54 substantially closes the bottoms of the conveyor cavities except for their communication with the central holes 58.

The capsules in the hopper 24 are agitated by an agitating plate 70 mounted on the rear wall 63 of the hopper 24. Such agitating plate may be of flexible plastic material, and is fastened at its upper edge to the rear wall 63. Adjacent its lower end, the agitating plate 70 is connected to the piston rod 72 of an air cylinder 74. The air cylinder is connected by air lines 75 and 76 to an air valve 78 having an air inlet line 79 and arranged to be operated by a cam follower lever 80 driven by a cam 82 on the shaft 16 of the lower sprockets 20 of the conveyor mounting. When the sprocket and conveyor are driven, the valve 78 supplies air to the air cylinder in rapidly reversing pulses to rapidly vibrate the vibrator plate 70 to keep the capsules in the hopper in a fluid condition for loading through the loading slot 68 to the conveyor cavities.

To displace extra capsules from conveyor cavities which are already filled or capsules which stand on end, either singly or in doubles in the cavities, a series of pivotally mounted fingers 84 are mounted on a supporting bar 86 in the center of the hopper 24 and extend downward into the loading slot 68 between the rolls 66. The fingers 84 are pivotly mounted in the bar 86 and are spring pressed to a downward position, but are free to swing resiliently upward as shown in dotted lines in FIG. 1.

In operation of the loading mechanism, the vacuum is continuously applied to the suction chamber 61 to induce a flow of air from the hopper downward through the feed slot 68, to and through the cavities 46 of the conveyor buckets traveling beneath such slot, beside the cam rail 56, and into the holes 58 in the slide rail 54. The capsules in the hopper 24 are continuously agitated by the vibration of the agitator plate 70, and the rolls 66 are continuously rotated in the direction indicated by the arrows, so that they tend to move away from the feed slot 68 any capsules which are misaligned with the feed slot. The capsules are urged by gravity and by the induced air flow to travel downward into the feed slot 68, and capsules which are properly aligned with the feed slot will pass through the feed slot and into the cavities 46 of the conveyor buckets 34. Once a cavity is filled, the spring fingers 84 will brush away any second capsules which tend to be carried with the filled bucket. If one or more capsules enter the conveyor cavities 46 in upstanding position, the spring fingers 84 will remove such upstanding capsules to return them to the loose bulk of capsules in the hopper. Capsules once loaded endwise in the cavities will be retained by the air flow or suction and will be carried upward and out of the hopper 24. The upward inclination of the conveyor, together with the action of the spring fingers 84 and the agitation from the plate 70 will maintain the bulk of capsules in a somewhat fluid state, and high rates of fill of the conveyor cavities have been attained.

Rectifying

The capsules are loaded in the conveyor cavities in random endwise orientation. Some of the capsules will be capforward, and others will be body-forward. It is necessary for all the capsules to have the same uniform orientation, preferably cap-forward.

The mechanism of the rectifying zone 26 is shown in FIGS. 7-10. The conveyor slide rail 54 extends at an upward slope of 45° continuously to and through the rectifying zone. The loading vacuum chamber 61 terminates ahead of the rectifying mechanism, and for a limited distance, no vacuum is applied to retain the capsules in the conveyor buckets. At the rectifying zone, a separate vacuum manifold 90 underlies the slide rail 54 and defines a vacuum chamber 92 above which the slide rail 54 is cut out to form a central vertical rectifying port 94. The cam rail 56 extends continuously from the loading zone to the rectifying port 94. Immediately ahead of such port 94, the upper surface of the cam rail 56 is provided with a slight upward rise 96, and then with a flat land 98. At the forward end of that land 98, the cam rail ends at a terminus 100, where the upward sloping cam rail is cut off at an angle of about 105° to form a shoulder which slops downward at an angle of about 30° from the horizontal. Such shoulder extends only a short distance, desirably less than the exposed height of the cam rail 56 above the slide rail 54 and less than the projecting length of a capsule body, and the cam rail below such shoulder is cut away to form a vertical edge 102 aligned with the vertical side face of the port 94.

The rectifying port 94 is of sufficient width to allow a capsule to turn upright as it crosses the port, but should be of limited width so that a partially tilted capsule will be promptly re-engaged by the camming mechanism while in tilted position. Beyond the rectification port 94 the forward end of the slide rail 54 carries a second cam rail 106. This has a rearward projecting nose 108 which extends into the rectification port 94 and has a rather steeply sloping edge presented rearward to assist in tilting capsules toward a forward-leaning position. Beyond that steeply sloping edge, the second cam rail 106 has a more gently sloping cam face 110 which extends somewhat more than the length of a conveyor bucket, and this leads to a flat land 112 which extends to the extreme end of cam rail 106 at a point adjacent to the transfer wheel 25.

Along the length of the second cam rail 106, the underlying forward end of the slide rail 54 contains a series of holes 59 communicating with a vacuum chamber 105. This induces downflow of air through the conveyor cavities as they traverse the second cam rail 106, to assist in the rectifying action and hold the rectified capsules in the conveyor.

In considering the operation of the rectifying mechanism, several things may be noted. The capsules are light-weight telescoped assemblies of an open-ended body and an open-ended cap. The rounded closed ends are relatively rigid, while the middle of the capsule, at the open end of the cap, is relatively less rigid and will compress slightly when pressed diametrically. The rectification is a dynamic operation which occurs as the capsules are carried by the conveyor rapidly upward and forward along the upwardly inclined cam rail. The capsules are influenced by gravity but even more by the flow of air induced downward through the conveyor cavities 46 and the rectifying slot 94 to the vacuum chamber 92.

Figures 7, 8, 9, 10:
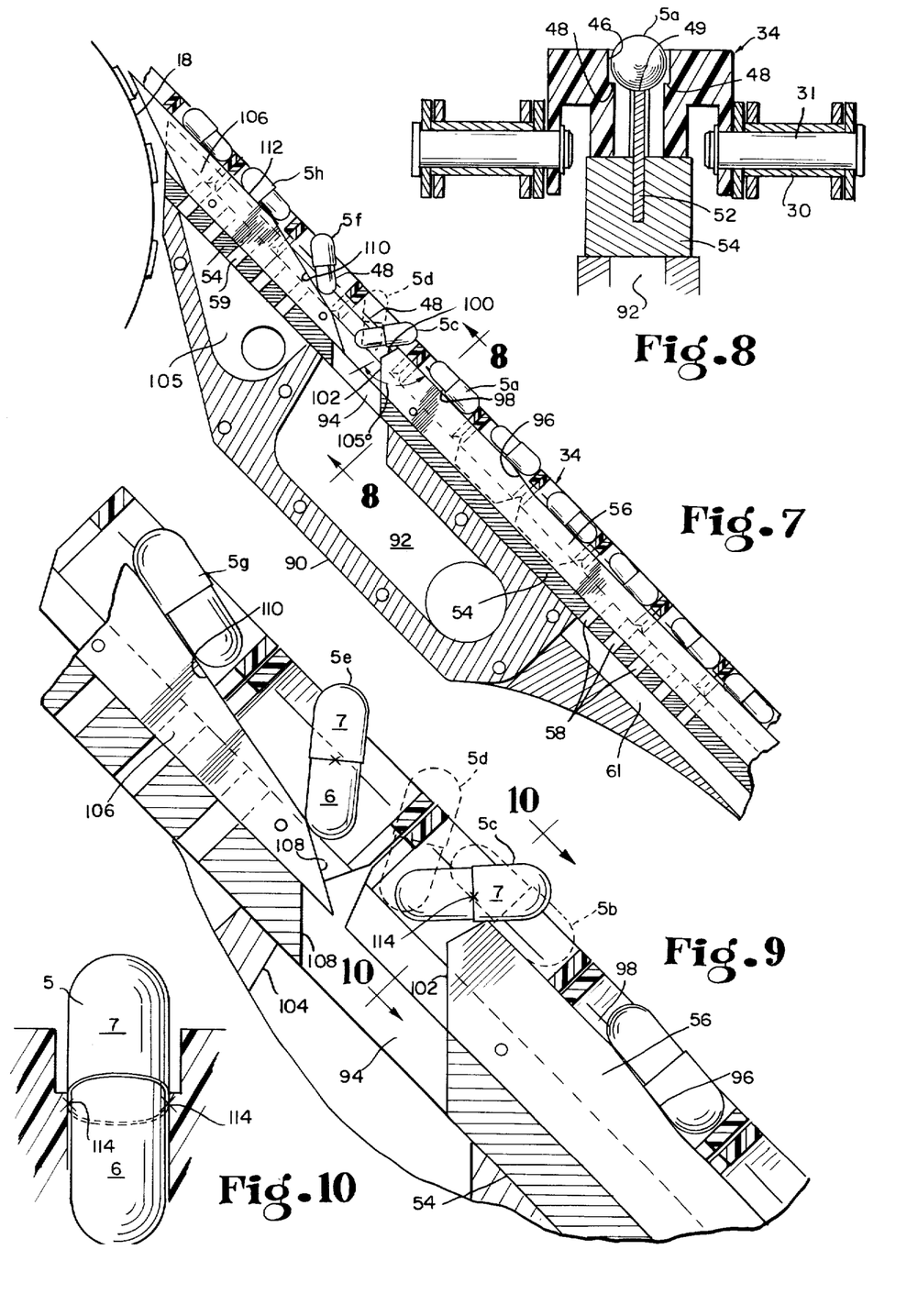
FIG. 7 is a somewhat diagrammatic longitudinal section showing the rectification action.
FIG. 8 is a section taken on the line 8—8 of FIG. 7.
FIG. 9 is a longitudinal section like FIG. 7 but on a larger scale.
FIG. 10 is a transverse section on the line 10—10 of FIG. 9 showing the slightly jammed fitting relation of a capsule between the cavity side shoulders.

As the capsules leave the loading zone, they are loosely contained in the upper portions of the cavities in the conveyor buckets, confined at their sides and ends by the side and end walls of the conveyor cavities, and supported from below by the top surface of the cam rail 56, as shown in FIG. 3. The cam rail 56 is of such height that the capsules ride deeply in the bucket cavities 46, with their side edges either supported by or close to the shoulders 48 at the sides of the cavities 46. The capsules are held in the cavities both by gravity and by downflow of air induced through the conveyor cavities 46 to the openings 58 in the slide rail 54. As the buckets pass to the rectifying zone, downflow of air is discontinued until the capsules reach the rectification port 94. As they approach such port, they are raised by the rise 96 of the cam rail 56 to an elevated position in which they are supported by the raised land 98, as shown in FIG. 8. Here, the capsule 5a rests on the raised land 98 of the cam rail 56, with its sides spaced well above the shoulders 48 at the sides of the cavity 46. As the capsule travels across the terminus 100 at the end of the cam rail 56, its forward end is carried beyond such shoulder into the downstream of air to and through the rectifying port 94. In FIG. 9, the capsule 5b is shown just passing across the terminus 100, but still in endwise position in the cavity. As the capsule is carried further, the down flowing air (and gravity) causes the capsule to tilt about the terminus 100 as to the position of the capsule 5c in FIGS. 7 and 9. Because of the previous elevation of the capsule, with its sides spaced upward from the shoulders 48 at the sides of the conveyor cavity, the capsule in such tilting movement gains some momentum before the sides of the capsule cap 7 engage such shoulders 48. Further, since the capsule is of circular cross-section at the open end of the cap 7, and since that circular cross-section approaches such shoulders in an angular position, when that engagement is made, a certain wedging action seems to occur which causes the open end of the capsule cap 7 to be wedged slightly between the shoulders 48. This causes the sides of the cap 7 to engage between such shoulders 48, and make contact with the inner faces of such shoulders at two side points of engagement, or pivot points 114, at or slightly below the upper faces of such shoulders. Such wedging action and the creation of such pivot points tends to hold the capsule against sliding rearward along the shoulders of its forwardly-traveling bucket, and provides points about which further tilting of the capsule tends to occur. Under the influence of airflow to the vertical port 94 and as the conveyor moves, the capsule pivots further about the pivot points 114 to a substantially vertical position in space and a forward-leaning position relative to the conveyor, as to the position of the capsule 5d in FIGS. 7 and 9.

As the conveyor continues to carry the capsule forward, its lower end engages the second cam rail 106. If the capsule is not sufficiently forward-leaning, its lower end will engage the rearward projecting nose 108, as shown by the position of the capsule 5e in FIG. 9, and this will tilt it further forward. The gently sloping cam rise 110 will then engage the capsule to lift and tilt it further toward a cap-forward position, as through the positions of the capsules 5f and 5g as the capsule is carried along the cam rise 110 and to the cam land 112, where the capsule assumes an endwise position as shown by the capsule 5h in FIG. 7.

Figure 4:
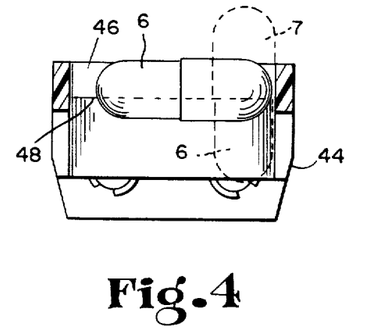
FIG. 4 is a longitudinal section of the preferred bucket.

In the event a capsule slides to the rear of its cavity, as to the position shown in dotted lines in FIG. 4, it will be held upright in the cavity with its body end substantially wholly contained in the deep lower portion or slot 50 of the cavity. As the upright capsule is carried forward its lower end will be engaged and lifted by the cam faces of the second cam rail 106. This will lift the capsule so that it will be free to tilt forward. Downflow of air through the cavity will be induced by suction through the openings 59 in the forward end of the rail 54, and such air flow will pull the capsule forward and down into cap-forward position.

Any capsules which are already in a cap-forward position as they are conveyed through the rectifying zone will not be turned end for end. As such a cap-forward capsule reaches the position of the capsule 5b in FIG. 9, and the down flowing of air tends to tilt such capsule about the terminus 100, the forward cap end of the capsule will engage the side shoulders 48 of its conveyor cavity and the capsule will not tilt further. As the trailing body end of the capsule passes the terminus 100, the air flow may tilt such trailing end downward, but this will occur only to a limited extent, and any tilting will be rectified by the action of the secondary cam 106 in the same manner as described above.

Because of the dynamic character of this rectifying action and of the rapid movement of the conveyor and capsules as it occurs, it is difficult to observe exactly what happens, and to ascertain with certainty that the above described wedging action always occurs. However, it is observed that the capsules do not move to the rear of the bucket cavities, and it has been found that when the conveyor has been stopped with capsules in intermediate positions of rectification, the capsules are held in a condition in which they pivot freely in the buckets and yet do not slide rearward toward the rear end of the buckets.

The wedging action described necessarily deforms the center portion of the capsule by slightly flattening into an oval configuration the otherwise circular open end of the capsule cap 7. Capsules will readily undergo such slight flexing at their middle portions.

Whatever the explanation, it is found that the apparatus shown and described produces reliable rectification of body-forward capsules, to turn such capsules to a cap-forward position, and does so at high rates of conveyor travel, with capsules being processed at rates of the order of 600 to 900 or 1200 capsules per minute. The rectification is carried out with substantially no loss of capsules from pinching or jamming as the capsules pass through the rectification operation. The improved rectification is accomplished with simple mechanism, without any necessity for the rotating brush and traveling belt of the mechanism of U.S. Pat. No. 3,756,402.

The rectification means also has the effect of removing scrap from the conveyor. If a conveyor bucket contains only a capsule body or other small fragment of a capsule, such body or fragment will be drawn through the rectifying port 94 into the vacuum chamber 92. From such chamber, the scrap capsule material may be collected in a box, not shown.

When the conveyor buckets leave the rectifying zone shown in FIGS. 7 and 9, all capsules in the cavities will be oriented in cap-forward position for delivery to the transfer wheel 25. It is not necessary that all bucket cavities be filled with capsules; indeed, the conveyor is desirably operated at a speed to handle capsules at a rate higher than the rate of supply to the hopper 24.

While the rectifying mechanism shown has the conveyor traveling in an upward inclination of about 45° in a vertical plane, the rectifying operation is not dependent upon that inclination or upon operation in a vertical plane, but it is adapted to operate in other positions.

Transfer Mechanism

Figure 11:
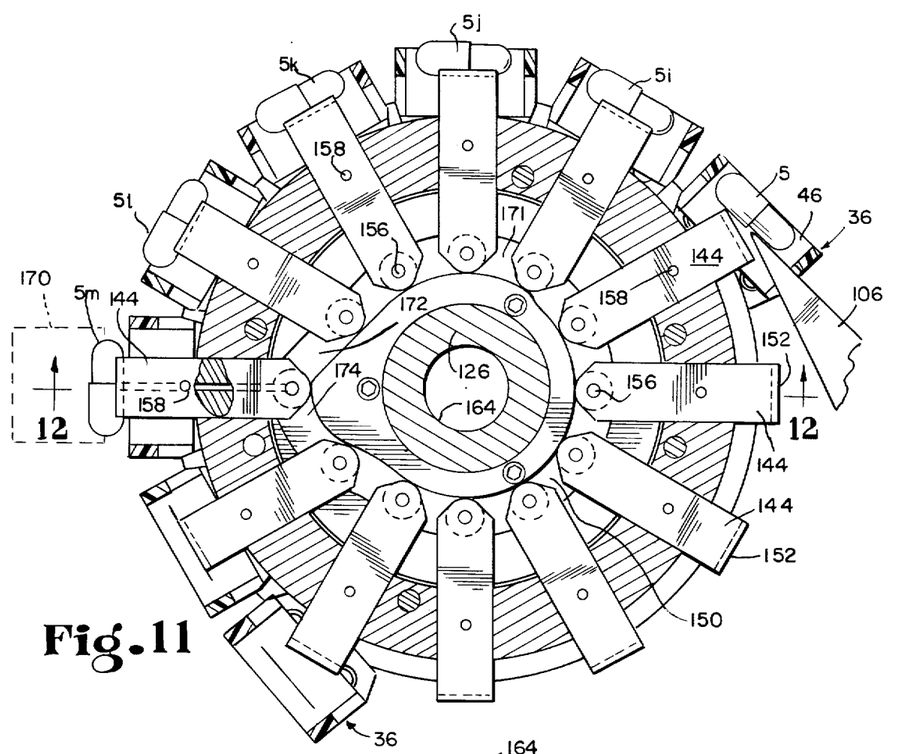
FIG. 11 is a vertical section through the transfer wheel.
Figure 12:
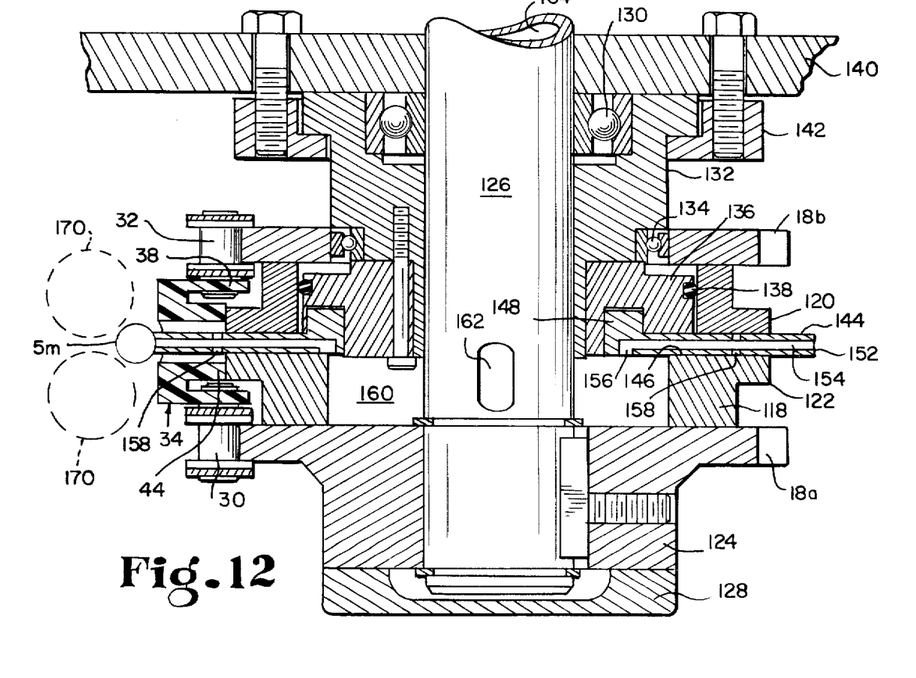
FIG. 12 is a horizontal section through the transfer wheel, taken on the line 12—12 of FIG. 11.

The transfer wheel 25 shown in FIGS. 11 and 12 comprises an assembly including two sprockets 18a and 18b over which the chains 30 and 32 of the conveyor are trained. Such sprockets are assembled against the opposite sides of a pair of ring members 118 and 120 which lie in face to face relation and have circumferential flanges which together form a central circumferential ring 122 that extends between the skirts 38 of the buckets 34 of the conveyor and provides an outer face against which the central portions 44 of the buckets ride. The two sprockets 18a and 18b and the rings 118 and 120 are bolted together to form a unitary rotor. The rotor has an outer hub 124 mounted on and driven by a hollow shaft 126 having an internal passage 164. An end cap 128 on the hub 124 seals the end of the shaft. The shaft is rotatably mounted in a ball bearing 130 mounted within a hollow fixed hub 132. The rotor is further supported by a ball bearing 134 between the fixed hub 132 and the inner sprocket 18b. A cam member 136 is mounted on a reduced diameter portion of the fixed hub 132, and is sealed to the ring member 120 by an O-ring 138. The fixed hub 132 is mounted against a mounting plate 140 by a clamping ring 142 which permits it to be adjustably rotated.

The transfer head carries a circumferential series of pick up fingers 144, each formed as a radial plunger mounted in a slide 146 formed between the two rings 118 and 120 and disposed centrally of the rim 122. Each plunger 144 has a laterally projecting cam follower boss 148 at its inner end and such cam follower bosses are received in a cam groove 150 formed in the cam member 136. The cam groove 150 is a closed cam groove, so that the cam followers and plungers 144 are positively driven both outward and inward by the shape of the closed cam 150.

Each pick up finger or plunger 144 is shaped at its outer end to form a tangentially disposed capsule seat 152 of concave cross-section, which is connected by an air passage 154 to a side port 156 at the inner end of the plunger, concentric with the cam follower boss 148. Intermediate the length of the air passage 154, there is a transverse bleed port 158, which normally lies between the side faces of the slide 146 and is closed by those faces. The side ports 156 of the air passages are normally in open communication with a vacuum chamber 160 within the ring 118 and connected through a port 162 to the hollow inner passage 164 of the shaft 126, which is connected to a source of vacuum. (Not shown).

The hollow shaft 126 is driven by a suitable power train, and through the sprockets 18a and 18b drives the conveyor 22. This in turn drives the lower sprockets 20 supporting the lower end of the conveyor chains, and drives the air-control cam 82. The transfer wheel 25 and the conveyor are driven in timed relation with the inspection head 28. That inspection head is more fully described in U.S. Pat. No. 3,756,402, and comprises a circumferential series of rollers 170 which form between them a circumferential series of grooves for the reception of capsules from the transfer wheel. The transfer head is provided with internal suction passage for retaining the capsules in the grooves between the rollers 170.

The operation of the pick up fingers or plungers 144 on the transfer wheel is illustrated in FIG. 11. The suction chamber 160 normally communicates through the ports 156 with the air passages 154 in the plungers. This induces an inward air flow at the seats 152, to attract capsules to those seats 152 and to hold capsules thereon as the plungers travel. As shown in FIG. 11, the forward end of the secondary cam rail 106 of the conveyor mechanism extends substantially to a point of tangency with the path of travel of the seats 152 at the outer ends of the plungers 144. At that point of tangency, the plungers 144 are retracted and the conveyor buckets 36 travel to a position straddling the plungers, with the bucket cavities 46 aligned with such plungers. Once this relationship is established, the cam followers 148 of the plungers 144 are lifted by a cam rise 171, and this advances the plungers to carry their seats 152 into engagement with the capsules 5 carried by the buckets 34 as shown by the capsule 5i in FIG. 11. The capsules 5 still remain within the bucket cavities 46, but they are now seated upon the seats 152 of the plungers and held thereto by vacuum. As the transfer wheel rotates to carry the capsules through the positions 5j through 5k in FIG. 11, the plungers remain in capsule-engaging, retracted positions. As the plungers approach the delivery position opposite the inspection head rollers 170, the cam groove 150 forms a cam rise 172 which progressively lifts each plunger 144 to an advanced delivery position in which its capsule 5m lies in a groove between a pair of rollers 170. As the plunger reaches this delivery position, its side outlet ports 158 are carried outward beyond the confining walls of the rings 118 and 120, as shown at the left in FIG. 11. This exposes such side ports to atmosphere and breaks the suction at valve seat 152, and releases the capsule 5m for transfer to the inspection wheel. Suction in that wheel transfers the capsule to the wheel.

Beyond the delivery position of the plungers 144, the cam groove 150 is formed with an inward slope 174 which promptly retracts the plungers 144 from engagement within the cavities 46 of the conveyor buckets, and clears such buckets for departure from the transfer wheel in the lower stretch of the conveyor chain.

Operation

The general operation of the capsule handling mechanism is as follows. Capsules are supplied to the hopper 24, as from the discharge chute from a capsule-making machine. The capsules in the hopper are kept agitated by the agitating plate 70, and those which are aligned with the feed slot fall between the rolls 66 to the conveyor. They are positively urged through the slot and into the cavities 46 of the buckets 34 by air flow to and through the holes 58 in the slide rail 54.

In the bucket cavities 46, the capsules are loosely received between the side and end walls of the upper portion of such cavities 46 and are supported from below by the cam rail 56. As received from the hopper, the capsules are in random endwise orientation in the cavities. The conveyor carries the capsules from the loading zone to the rectifying zone 26, shown in detail in FIGS. 7–10. Capsules in body-forward position are there turned end for end in the manner described in the section entitled "Rectifying" set forth above. Also, the rectifying suction port removes from the conveyor any separate bodies or capsule fragments which are small enough to pass through the bottom openings of the buckets, and such bodies or fragments are carried through the suction passages to a collection box.

The capsules which are contained in the cavities of the conveyor as it leaves the rectifying zone are all in cap-forward position and are carried to the transfer wheel shown in FIGS. 11 and 12. The radial pick up fingers 144 are mounted internally of the wheel on which the conveyor travels, and travel with the buckets, at the same speed, and continuously in registry with the bucket cavities over a considerable arc of travel. During such travel, the plungers are progressively advanced outward through the bottom openings of the cavities. This causes the capsules to be picked up on the seats 152 of the plungers 144, where they are held by vacuum until the plungers reach the discharge position shown in the left in FIG. 11. Here the vacuum holding the capsules 5 on the plungers is vented to atmosphere through the side ports 158, and this releases the capsules for transfer to the inspection head 28.

The rectification action is characterized in that as the capsules approach the rectifying position, they are supported by a central narrow cam rail 56 with their sides elevated well above the underlying shoulders 48 of the conveyor buckets, so that the capsules can tilt about the terminus 100 through a substantial angle before their sides engage those side shoulders of the buckets.

Upon such engagement, the sides of the capsule cap 7 appear to wedge slightly between the side shoulders 48 and form two side points of engagement 114 which tend to prevent the capsules from sliding to the rear of the bucket cavities 46 and tend to cause further pivoting to occur about those pivot points 114 intermediate the length of the cavities. As the result, and under the influence of the downward air flow, the capsules pivot to a substantially vertical position in space and to a forward-leaning position with respect to the conveyor. The bottom ends of their bodies 6 are then carried into engagement with the second cam rail 106, and its nose portion 108 and rising slope 110 further tilt and lift the capsules to a cap-forward position. Capsules which are originally in cap-forward position will not be inverted, because their forward cap ends will engage the side shoulders 48 and prevent tilting as the capsules are carried across the rectifying zone.

The foregoing specification and accompanying drawings set forth the best mode of carrying out the invention as now known. It will be understood, however, that various modifications may be made by those skilled in the art without departing from the spirit of the invention or the scope of the following claims.

We claim:

1. Apparatus for handling medicinal capsules or the like to present the same successively in uniform endwise orientation, comprising rectification, a conveyor forming a series of spaced cavities having capsule receiving portions for conveying capsules endwise along a conveyor path, each such receiving portion being shaped to loosely confine an individual capsule therein and being open at one side for purposes of rectification.

means forming at said one side a deep rectifying slot defined at its entrance by spaced side shoulders on and moving with the conveyor, the slot width and shoulder spacing being such as to pass the body of a capsule but retain the cap thereof, said slot having a depth beyond said shoulders sufficient to substantially contain therein the projecting body of an upstanding capsule supported at its cap edges by said shoulders, the conveyor having a longitudinal rail slot centrally of such rectifying slot for the reception of a cam rail, a cam rail extending over a portion of the conveyor path, received in said rail slot, and having a capsule-engaging edge presented toward the capsule receiving portions of said cavities to support capsules in endwise orientation therein over said portion of the conveyor path, said rail having an abrupt terminus at a rectifying position, so arranged that at an intermediate position of travel across said terminus a body-forward capsule will have its rear cap end supported by the cam rail and its forward body end projecting unsupported beyond said terminus, said capsule-engaging rail face having an elevation immediately ahead of said terminus to support the capsule with its sides spaced from said shoulders of the rectifying slot to permit at least partial tilting of a body-forward capsule about the terminus before the cap thereof engages said shoulders, means at the rectifying position to induce airflow through the rectifying slot against the unsupported capsule end for positively urging the capsule to tilt about said terminus toward a cap-forward position, a secondary cam rail positioned to enter said rail slot as the cavities are carried beyond said terminus and having a camming surface to engage the lower end of a partially tilted capsule to cam the same toward the capsule-receiving portion of the cavity, and means to induce airflow through the cavities and rectifying slots as the same traverse said secondary cam rail to cause the capsules engaged by such camming surface to be retained and to tilt to a cap-forward endwise position in the capsule-receiving portions of the cavities.

2. Apparatus as in claim 1 in which said elevation of the cam rail face ahead of said terminus, relative to the position of said shoulders, is such that the circular open end of the capsule cap of a tilting capsule engages said shoulders at an angular orientation causing such open end to wedge itself between the shoulders to form side points of engagement between itself and the shoulders about which further tilting movement of the capsule tends to occur and which resist sliding movement of the capsule endwise of the shoulders.

3. Apparatus as in claim 1 in which said rail slot extends upward from the bottom end of said deep rectifying slot and said secondary cam rail has at its rearward end a cam nose surface which lies below the path of the bottom end of said slot so as to engage from below a capsule carried thereto in upstanding position in the cavity.

4. Apparatus as in claim 3 in which said deep rectifying slot is defined at the rear by end walls which straddle said secondary cam rail as the cavity is conveyed therealong so as to engage the lower end of a capsule as the same is cammed upward by the camming surface of such rail.

5. Apparatus as in claim 1 wherein said conveyor comprises a series of buckets having body portions containing said cavities, interconnected in chain relation, each bucket having an upper portion defining a capsule-receiving cavity therein, and a downward extending lower portion defining said deep rectification slot below said shoulders, said slot being defined at the rear by end walls which straddle said secondary cam rail and stand in position to engage the lower end of a capsule as the same is cammed upward by the camming surface of said rail, said camming surface of said secondary rail having at its rearward end a cam nose surface positioned to lie below the lower end of a capsule conveyed thereto in upstanding position, so as to cam such lower end upward.

6. Apparatus as in claim 1 wherein said conveyor comprises a series of buckets interconnected in chain relation, each bucket having an upper portion defining a capsule-receiving cavity with capsule-retaining side shoulders therein, and having a downward-extending lower portion defining said deep rectification slot below such shoulders, said lower portion having a bottom slide surface and having a central longitudinal rail slot therethrough, said conveyor extending through an operative stretch, a slide rail underlying said operative stretch and slidably engaged by said bottom slide surfaces of the buckets to support the same for movement through said operative stretch, said cam rail and secondary cam rail being mounted to stand above said slide rail and to be straddled by said buckets as they move along the slide rail.

7. Apparatus as in claim 1 in which said conveyor extends in an operative stretch at an upward inclination with the rectification slots of said cavities in a vertical plane, so that capsules conveyed endwise to said rectifying position cross said rail terminus in such upward inclination, and said means to induce airflow at the rectifying position comprises a vertical suction passage communicating with said rectification slots from below to induce airflow vertically downward past the upwardly inclined capsules so as to tend to tilt them toward a vertical position in space and a forward leaning position relative to the conveyor travel.

8. Apparatus as in claim 7 in which said camming surface of said secondary cam rail is positioned to engage said tilted capsules while they are in such forward leaning position.

9. Apparatus for handling medicinal capsules and the like to present the same in uniform endwise orientation, comprising a series of conveyor buckets interconnected in chain relation, each bucket comprising a body having an upper portion defining a capsule-receiving cavity therein, elongated in the direction of conveyor travel to carry a capsule endwise in such direction, and shaped to loosely receive a capsule fed thereto from the top, said body having a downward extending central portion defining a rectification slot joined to said cavity at side shoulders spaced apart so as to pass the body of a capsule but retain the cap thereof, said central portion having a central longitudinal rail slot to pass a cam rail, a slide rail having a surface to slidably support said buckets for movement through an operative stretch, a first cam rail mounted in upstanding relation along a portion of said slide rail so as to be received in said rail slots of the buckets and having an upper edge disposed to slidably support capsules in the cavities as the buckets traverse such cam rail, said cam rail having an abrupt terminus at a rectifying position, so arranged that at an intermediate position of travel across such terminus, a body-forward capsule will have its rear end supported by the cam rail and its forward end projecting unsupported beyond said terminus, means at said rectifying position to induce airflow through the rectifying slot of the cavity containing a capsule in such intermediate position of travel for positively urging the capsule to tilt about said terminus to carry its body end downward into the rectification slot and to carry its cap edges into engagement with the side shoulders, the capsule being thereby tilted at least partially toward cap-forward position, and a secondary cam rail mounted in spaced relation with said terminus and aligned with said first cam rail to enter the rail slots of and be straddled by the buckets as they pass through the rectifying position, said secondary cam rail having a camming surface disposed to engage the lower ends of partially tilted capsules in the buckets and to cam such ends upward as the buckets traverse the secondary cam rail.

10. Apparatus as in claim 9 which includes means to induce airflow downward through the cavity and rectifying slot of a bucket as the same traverses the camming surface of the secondary cam rail, so as to assist in tilting a capsule in the bucket to cap-forward position as it is lifted by said camming surface.

11. Apparatus as in claim 9 in which the conveyor buckets have slide surfaces at the bottom of their central portions, said slide rail is positioned to be slidably engaged by said bucket slide surfaces and said cam rails are mounted centrally in said slide rails.

12. Appparatus as in claim 11 with the addition of suction apertures in the slide rail close beside the cam rails, the rectification slots of the buckets being open at the bottom to communicate with said suction apertures so that the suction therein induces downward airflow through the bucket cavities.

13. Apparatus as in claim 12 in which said suction apertures are formed by central holes in the slide rail, wider than the cam rail thickness, and the cam rail is mounted to intersect said holes.

14. Apparatus as in claim 12, in which the buckets have side skirts spaced outward from said central portions, and a pair of chains interconnecting the buckets and having pins thereof engaged in holes in said side skirts.

15. Apparatus as in claim 9 in which the capsule-supporting upper edge of the first cam rail immediately ahead of the terminus has an elevation relative to the side shoulders such that the tilting movement of the capsule about the terminus attains a degree of momentum before the circular open end of the capsule cap engages said side shoulders, and such that said circular open end engages such shoulders at an angular orientation to the shoulders, so as to cause the said open end to enter between the shoulders and form side points of engagement between itself and the shoulders about which further tilting movement of the capsule tends to occur and which resist sliding movement of the capsule endwise of the shoulders.

16. Apparatus as in claim 9 in which the cavity and rectification slot in each bucket is defined at the rear by surfaces substantially normal to the direction of bucket travel so as to hold in upright position a capsule which slides to the rear of the cavity during rectification, the camming surface of said secondary cam rail having a rear nose portion at a level to engage below a capsule so held, and such camming surface being operative to lift the capsule along such rear surfaces.

17. Apparatus as in claim 16 which includes means to induce airflow downward through the cavity and rectifying slot of a bucket as the same transverses the camming surface of the secondary cam rail, so as to assist in tilting a capsule in the bucket to cap-forward position as it is lifted by said camming surface.

18. Apparatus for conveying capsules, comprising
a series of conveyor buckets interconnected in chain relation,
each bucket having an upper portion defining a capsule-receiving cavity elongated in the direction of conveyor travel for containing a capsule disposed endwise in such direction,
each bucket also having a deep lower portion having a supporting slide surface at the bottom thereof and defining a wide opening defined by side and end walls and extending from the capsule-receiving cavity to and through such bottom slide surface, and having a downwardly open narrow longitudinal rail slot intersecting the end walls of, and narrower than, said opening, means for supporting said buckets for movement along a conveyor path and including a slide rail having a slide face engaged by the bottom slide surfaces of the buckets, and a cam rail upstanding from said slide rail and engaged in the rail slots of the buckets, said rails serving to substantially close the bottom and end wall openings of the buckets and having a capsule-engaging top edge disposed to lie below the elongated capsule-receiving cavities of the buckets to support capsules in endwise orientation therein, and air openings in the rails in position to communicate with the bottom openings of the buckets, at the sides of the cam rail, and means to induce downward air flow through said air openings to thereby induce down flow in the capsule-receiving cavities to retain capsules therein and on said cam rail.

* * * * *

UNITED STATES PATENT OFFICE
CERTIFICATE OF CORRECTION

Patent No. 3,917,055      Dated  November 4, 1975

Inventor(s) Willard J. VandenBerg et al.

It is certified that error appears in the above-identified patent and that said Letters Patent are hereby corrected as shown below:

Column 11, line 55, after "comprising", omit "rectification";

line 60, after "rectification" change the period to a comma.

Column 14, line 41, change "appparatus" to -- apparatus --;

line 51, in the first line of claim 14, change "claim 12" to -- claim 11 --.

Column 15, line 16, change "transverses" to -- traverses --.

Signed and Sealed this twentieth Day of April 1976

[SEAL]

Attest:

RUTH C. MASON
Attesting Officer

C. MARSHALL DANN
Commissioner of Patents and Trademarks